Sept. 24, 1935.  H. A. WHITESIDE  2,015,209
RESISTANCE ADAPTER
Original Filed Sept. 28, 1929
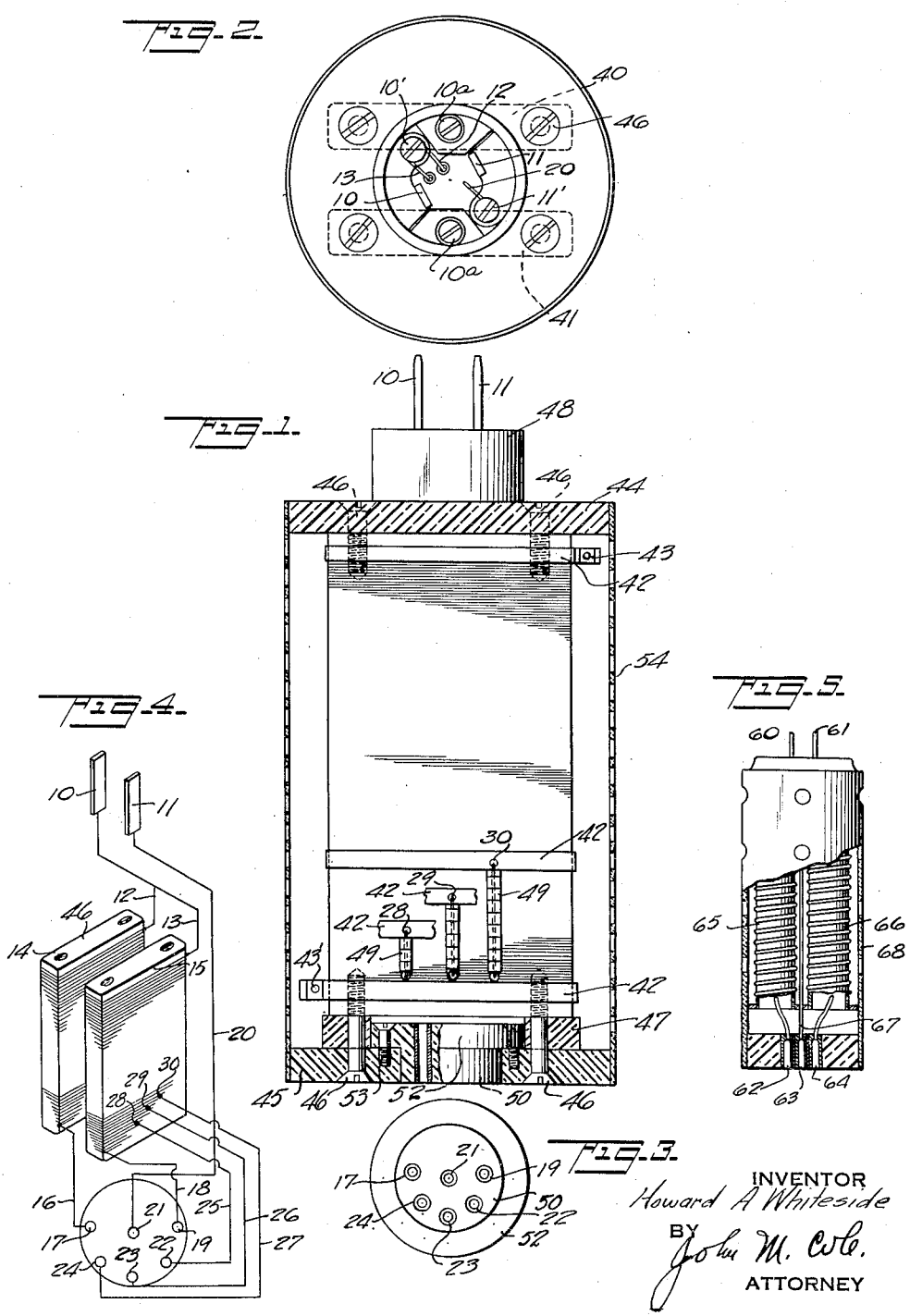
INVENTOR
Howard A. Whiteside
BY John M. Cole.
ATTORNEY Patented Sept. 24, 1935

2,015,209

UNITED STATES PATENT OFFICE 2,015,209

RESISTANCE ADAPTER

Howard A. Whiteside, New York, N. Y.

Application September 28, 1929, Serial No. 395,979
Renewed February 7, 1935

7 Claims. (Cl. 201—48)

The present invention relates to adapter resistances and is more particularly directed toward adapter resistances suitable for use in the circuits for dental and surgical engines.

Motors used in dental and surgical engines of the type having a motorized tool unit with the tool directly connected to the motor so that the motor and tool will be held in the hand while performing dental and surgical operations, preferably have field and armature windings adapted to be energized from separately controlled current sources. When the field and armature are wound so that the motor operates on low voltages such as 6 to 12 volts, the field may be supplied directly from the power source and the armature current controlled by a mere series resistance, but where the motor is wound so that the motor operates on power mains such as 110 volt alternating current mains, it is desirable to provide a motor circuit in which the field current is comparatively large but the drop across the field is low, and in order to provide a high power factor, the field is connected into the circuit through a non-inductive or substantially non-inductive external resistance. The armature circuit of the motor is preferably tapped off a potentiometer, selected voltages from the potentiometer being applied to the motor armature by means of a controller. A surgical outfit of the type above referred to is shown in my Patent No. 1,836,350, granted on December 15, 1931, on application Serial No. 113,885, filed June 5, 1926. The surgical outfit shown in that application utilizes an adapter resistance, controller and motorized tool unit adapted to be operated from the lighting mains, but there part only of the potentiometer resistance is in the adapter resistance unit, the remainder being in the controller body.

As these surgical outfits are intended to be readily portable, they are preferably made up to have the adapter resistance as a separate unit which may be plugged into any convenience outlet and which may be connected up to the controller by a suitable multiple conductor cord.

In my application for Controllers for dental and surgical engines, filed September 28, 1929, as Serial No. 395,978, I have shown a controller for a surgical and dental engine employing a circuit arrangement wherein the entire armature or potentiometer resistance is external to the controller, this arrangement being preferred in order to avoid the heating in the controller body and making it possible to transfer all the heated parts to the adapter resistance which may be mounted in any convenient location.

The present invention contemplates a unitary adapter resistance for the purposes above referred to, the unit being provided with an input tap so that it can be plugged into an electrical outlet and with an output receptacle to receive a multiple conductor plug for connecting the device to the controller. In one form shown, the entire potentiometer resistance and armature taps are in the adapter resistance unit.

The accompanying drawing shows, for purposes of illustrating the present invention two of the many possible embodiments in which the invention may take form, it being understood that the drawing is illustrative of the invention rather than limiting the same.

In the drawing:

Figure 1 is a vertical sectional view through one form of adapter resistance, parts being in elevation;

Figure 2 is an end view of the input end of the device;

Figure 3 is an end view of the output receptacle;

Figure 4 is a circuit diagram; and

Figure 5 is an elevational view, with parts in section, showing a modified form of construction.

Referring first to the wiring diagram of Figure 4 it will be noted that the device employs two supply terminals or blades 10 and 11. The supply terminal or blade 11 is connected by wires 12 and 13 with two resistance coils indicated at 14 and 15. The other end of the resistance coil 14 is connected by a wire 16 to an output terminal 17 while the opposite end of the resistance coil 15 is connected by a wire 18 with an output terminal 19. The supply line contact is connected by a wire 20 with an output terminal 21. Other output terminals 22, 23 and 24 are connected by lines 25, 26 and 27 with selected points 28, 29 and 30 on the resistance coil 15.

Resistance coil 14 is intended for the external resistance in the field circuit of the motor and may, for example, be proportioned to provide a field current of about 0.8 of an ampere. The resistance coil 15 includes the entire potentiometer resistance above referred to and may, if desired, be arranged to bypass about 0.8 of an ampere, and the points 28, 29 and 30 where the armature current is tapped off, may be arranged to give any desired voltage according to the characteristics of the motor armature circuit. The currents in the motor field and armature may be maintained substantially in phase with one another by properly proportioning the circuit parts so that a shunt motor may develop torque on alternating current.

The resistance coils 14 and 15 may conveniently be wound on cores in the form of slabs 40 and 41 of insulating material, such for example as asbestos wood, this material being preferred as it is of light weight. The resistance wire is provided with terminals in the form of metal bands 42 of the type commonly employed with porcelain tube resistances, these bands being provided with binding posts such as indicated at 43. The slabs of insulating material 40 and 41 may be rectangular in shape and are preferably secured to end plates 44 and 45 by screws indicated at 46. These screws enter tapped holes in the slabs of insulating material, and, in the lower end of the device, spacers 47 are employed to separate the end plate from the ends of the resistance cores and accommodate the output tap.

The input end of the device may be conveniently made in the form of an ordinary current tap indicated at 48 and carrying the usual blade contacts 10 and 11 and binding posts 10' and 11' and secured to the end plate 44 by screws 10a. The wires 12 and 13 are connected from the binding post 10' to the binding posts 43 carried on the upper bands of the resistance units. The wire 20 leading from the binding post 11' is carried directly through the unit being preferably disposed between the two resistance coils and connects directly with the line terminal 21 of the outlet receptacle 50.

The contacts 17 and 19 of the outlet receptacle 50 are connected with binding posts 43' carried at the lower ends of the bands of the resistance coils. To complete the connections, the wires 25, 26 and 27 are preferably covered by insulation beads 49 and extended downwardly as indicated in Figure 1 and then carried through holes in the core or slab 41 and are then connected to the receptacle contacts 22, 23 and 24. It will be noted that the output receptacle contacts are so disposed that improper plugging is prevented.

The receptacle 50 is flanged at the rear as indicated at 52 and is held in place by screws indicated at 53. The receptacle with wires attached may be secured to the lower disk 45 and then the wires connected to the various binding posts carried by the bands above referred to. In order to protect the parts and provide a finished appearance, the device is preferably provided with a casing 54 of insulating material which surrounds the end disks 44 and 45. Where one desires direct control of the armature current without the potentiometer arrangement, the wire 18 and contact 19 may be omitted. The taps may be placed in desired locations and may be varied in number, as desired.

The resistance adapter is shown in Figure 5 and is one intended for use where part of the potentiometer resistance is in the controller as shown in my application above referred to. It is also shown in my Patent No. 1,836,350, above referred to. In this construction, the current supply blades are indicated at 60 and 61 and the output receptacle contacts are indicated at 62, 63 and 64. One of the blades, such as 61, is connected to two coils 65 and 66, one for the motor field resistance and the other for part of the armature or potentiometer resistance. The input contact 60 is connected by a wire 67 with the line contact 63 of the output end of the device. The blades 60 and 61 may be any conventional current tap while the output contacts 62, 63 and 64 are asymmetrically arranged so as to prevent improper connections in the circuit. This device is likewise preferably protected by an external covering of perforated insulating material 68. This arrangement may be employed where it is desired to operate the armature at a single speed with series resistance control.

It is obvious that the invention may be embodied in many forms and constructions, and I wish it to be understood that the particular forms shown are but a few of the many forms. Various modifications and changes being possible, I do not limit myself in any way with respect thereto.

I claim:

1. A combined adapter and resistance for motors, having a pair of input contacts for plugging into an electrical outlet, an output receptacle having non-symmetrically arranged receptacle contacts to receive a multiple conductor plug, two resistance coils both having one end connected to one of the input contacts and the other end of each being connected to an output contact, and a direct connection from the other input contact to another output contact.

2. A combined adapter and resistance for motors, having a pair of input contacts for plugging into an electrical outlet, an output receptacle having non-symmetrically arranged receptacle contacts to receive a multiple conductor plug, two resistance coils both having one end connected to one of the input contacts and the other end of each being connected to an output contact, a direct connection from the other input contact to another output contact, and a plurality of additional output contacts connected to intermediate points on one of the resistance coils.

3. A combined adapter and resistance for motors, having a pair of input contacts for plugging into an electrical outlet, an output receptacle having non-symmetrically arranged receptacle contacts to receive a multiple conductor plug, two resistance coils wound on separate cores spaced apart, both coils having one end connected to one of the input contacts and the other end of each being connected to an output contact, and a direct connection from the other input contact to another output contact, said connection being carried between the coils.

4. A combined adapter and resistance for motors, comprising a field resistance coil wound on a support, an armature resistance coil wound on a support, end plates to which the coil supports are attached, a two-blade input tap carried by one end plate, a multiple outlet receptacle carried by the other end plate, a connection from one input blade to one end of both coils, a connection from the other end of each coil to an output receptacle contact, and a direct connection from the other blade contact to another output contact.

5. A combined adapter and resistance for motors, comprising a field resistance coil wound on a support, an armature resistance coil wound on a support, end plates to which the coil supports are attached, a two-blade input tap carried by one end plate, a multiple outlet receptacle carried by the other end plate, a connection from one input blade to one end of both coils, a connection from the other end of each coil to an output receptacle contact, a direct connection from the other blade contact to another output contact, and a plurality of additional output contacts connected to intermediate points on the armature resistance coil.

6. In a device of the class described, a pair of end plates, a pair of cores mounted between the plates, each carrying a resistance coil wound thereon, a double contact plug carried by one end plate and a multiple contact receptacle by the other end plate, the plug being connected on one side to both coils and on the other side to the output receptacle, the coils being connected to other output receptacle contacts, the outlet receptacle contacts being non-symmetrically located.

7. In a device of the class described, two cores, a coil on each core, each coil being adapted to withstand lighting circuit potential without overheating, a plug having a terminal by which both coils are connected to one side of the line, and an output receptacle having contacts separately connected to both coils and another contact connected with the other terminal of the plug.

HOWARD A. WHITESIDE.